United States Patent [19]
Feit et al.

[11] 4,023,208
[45] May 10, 1977

[54] PROTECTIVE COATINGS FOR A MAGNETIC TAPE SENSOR

[75] Inventors: Eugene David Feit, Berkeley Heights; Larry Flack Thompson, Gillette, both of N.J.

[73] Assignee: Bell Telephone Laboratories, Incorporated, Murray Hill, N.J.

[22] Filed: July 8, 1976

[21] Appl. No.: 703,512

Related U.S. Application Data

[63] Continuation of Ser. No. 575,618, May 8, 1975, abandoned.

[52] U.S. Cl. ............................................. 360/122
[51] Int. Cl.² ........................................ G11B 5/22
[58] Field of Search ............ 360/122; 235/61.11 D; 260/77.5

[56] References Cited

UNITED STATES PATENTS

| | | | |
|---|---|---|---|
| 2,563,776 | 8/1951 | Dickey et al. | 260/77.5 |
| 3,249,700 | 5/1966 | Duinker et al. | 360/122 |
| 3,417,386 | 12/1968 | Schneider | 360/122 |
| 3,479,328 | 11/1969 | Nordstrom | 260/86.1 |
| 3,665,436 | 5/1972 | Murray et al. | 360/122 |
| 3,932,731 | 1/1976 | Moore | 235/61.11 D |

Primary Examiner—Robert S. Tupper
Attorney, Agent, or Firm—Peter V. D. Wilde

[57] ABSTRACT

Several materials have been proposed as protective coatings for magnetic sensing heads in magnetic tape readers. Some of these, known for hardness, are not very wear resistant. Others that seem to wear well tend to spall. The invention is a polymer coating that wears exceptionally well, can be formed conveniently to encapsulate the magnetic sensing elements, can be photocured and therefore photopatterned, and is inexpensive. The polymer is composed of a mixture of urethane-modified acrylates and methacrylates.

7 Claims, 6 Drawing Figures

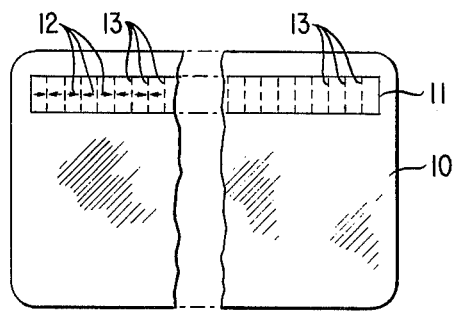
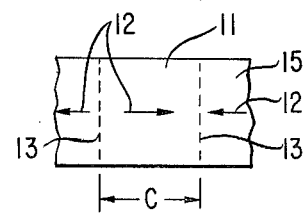
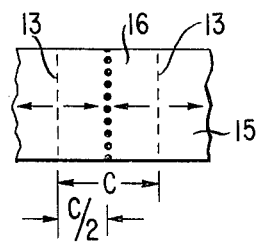
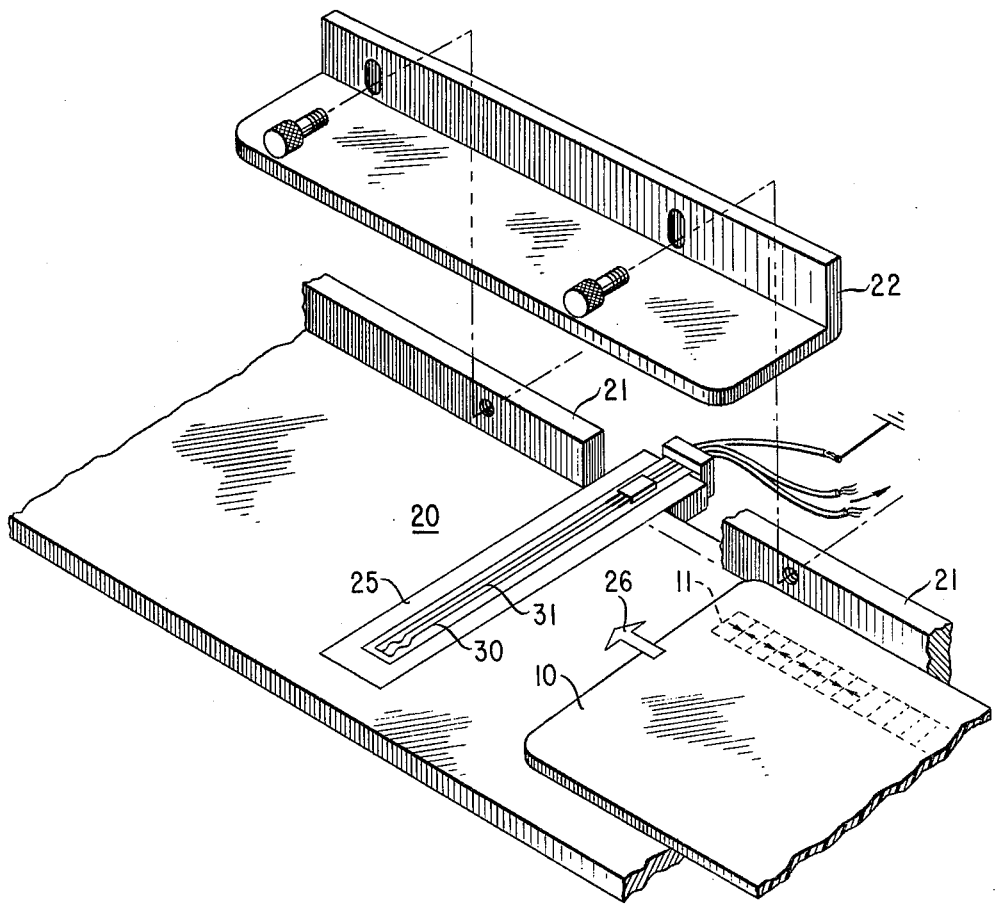

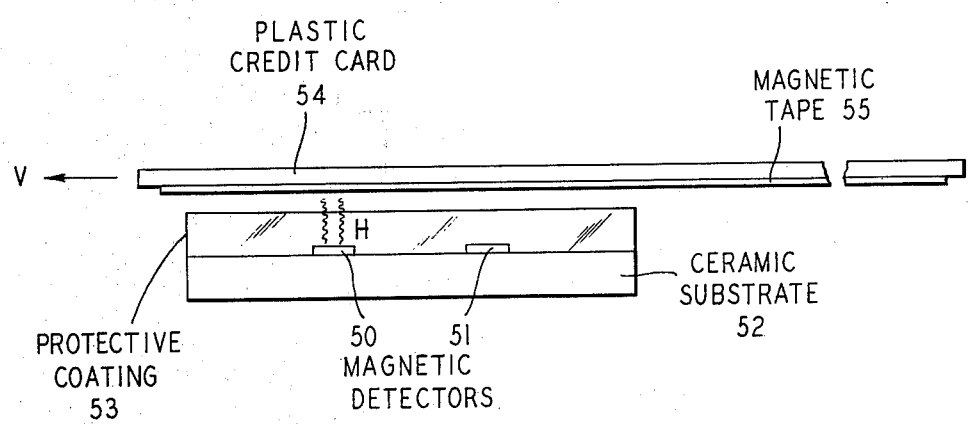
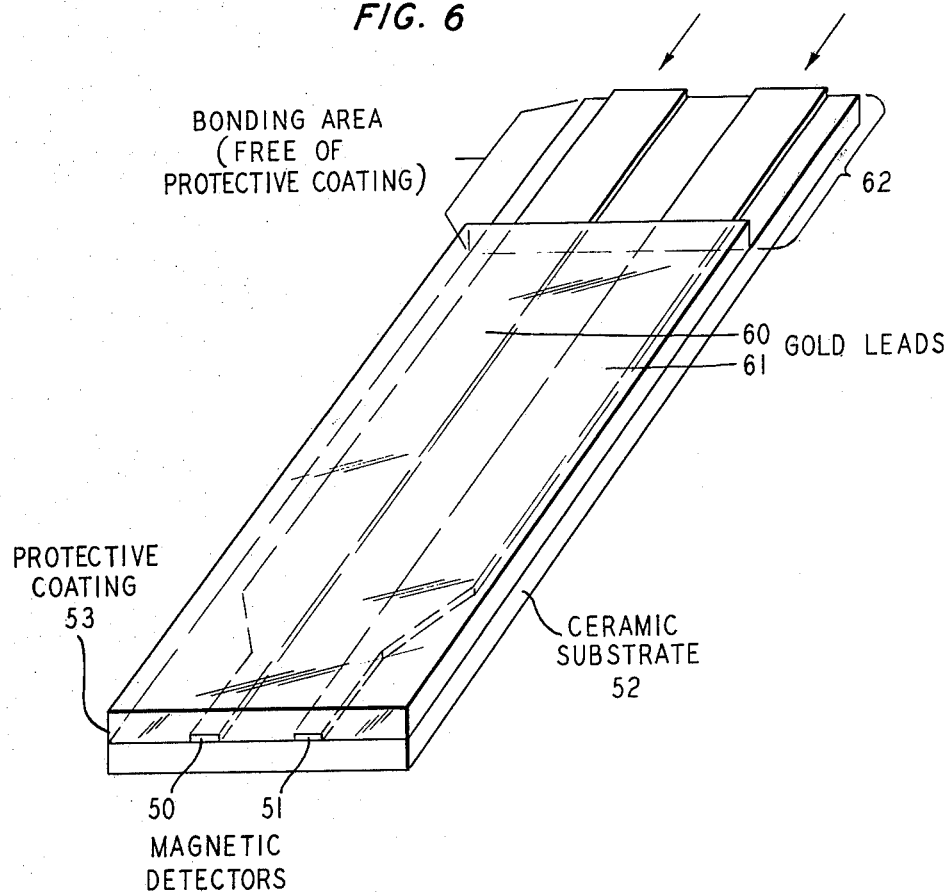

PROTECTIVE COATINGS FOR A MAGNETIC TAPE SENSOR

This application is a continuation of application Ser. No. 575,618, filed May 8, 1975, and now abandoned.

FIELD OF THE INVENTION

This invention relates to a code conversion apparatus of the kind used for reading magnetic tape codes. More specifically the invention is directed to long wearing magnetic sensing heads for credit card readers.

BACKGROUND OF THE INVENTION

Credit card readers have been devised which rely on magnetic codes stored on the card in the form of binary data. A simple and reliable code scheme is a bar code known as the "Aiken code." In this scheme binary data is stored on the magnetic tape in the form of magnetic domain transistors spaced along the tape. The presence or absence of a transistor (actually an interface between oppositely poled magnetic domains) indicates a binary one or zero. Since this data is represented specifically along the tape axis the reading speed must be carefully controlled at a uniform rate to coincide with a clocking arrangement incorporated into the reader. This requires typically a motorized arrangement to feed the card passed the sensing head of the reader.

Systems are available in which timing data is incorporated into the magnetic tape so the card reader can sense the instantaneous rate of tape travel and adjust accordingly the clocking circuit in the reader. By comparison with the system described here, such systems are unnecessarily complex and have difficulty in responding if the card reading rate is interrupted or grossly varied.

A simple credit card reader that overcomes the foregoing, at least in part, is described and claimed in application Ser. No. 553,528 filed Feb. 27, 1975 in the name of G. E. Moore, Jr. In this device two sensing elements are spaced one-half cell length apart to provide in response to the code information independent outputs which when applied to simple logic circuitry provide separate representations of the data and the timing information. The logic circuitry includes decisional circuitry responsive to outputs from the two elements for generating an output stream containing timing information. The timing information in conjunction with the outputs of both of the sensor elements is used to generate a separate output stream containing data.

In a preferred embodiment, a pair of magneto-resistive sensor elements are spaced one-half cell length apart in the path of the code. Each element responds independently to the regular transitions at the beginning and at the end of a cell and also to the irregular transitions (data information) stored in the center of the cell. Due to the spacing between elements, an output is received from the two elements simultaneously only when a data bit (a binary one) is stored. Only one element is activated when no data bit (a binary zero) is stored. The electronic output is independent of the speed at which the code passes the sensor.

A simple electronic circuit processes the outputs of the two elements typically for transmission to a remote computer. The outputs are applied to an OR circuit, the output of which is employed both to enable the data from the elements to be applied (via an AND gate) to a shift register and to provide a clock pulse for the shift register. The operation provides enabling pulses with widths reflective of the movement of the credit card and the effect is that the output from at least one of the elements is stored in the shift register whenever the corresponding bits of the code arrive at the sensor.

The operation depends on the close proximity of the elements to one another. In order to achieve the desired proximity, magnetoresistive sensor elements are formed by photolithographic techniques and are connected electrically in parallel to provide independent indications of the code as required. The constraint on the magnetoresistive elements impose design criteria realized in a novel approach herein. Each element, for example, includes a plurality of subelements having a prescribed growth or shape anisotropy. The subelements are connected electrically in series and respond to the presence of a transition of the code by the rotation of the magnetization therein.

From the foregoing it is evident that in this equipment the magnetic sensing head is an important element and it is vital that the integrity of the magnetic sensing elements and the space between them be precisely preserved. This requires a protective layer into which the sensing elements are embedded. The layer should be of a material that is nonmagnetic (so as not to interfere with the magnetic data being sensed) durable and in which the sensing elements can be rigidly suspended by a simple casting or potting process.

Various kinds of protective coatings for magnetic sensing heads have been proposed in the art. Well recognized are the requirements for hardness and durability, for the sensor should withstand exposure to a tape which contains hard particles of magnetic oxide that can be severely abrasive over a period of continued use.

U.S. Pat. No. 3,249,700 issued May 3, 1966 to S. Duinker et al proposes a glass protective layer. Glasses, aside from their tendency to crack and devitrify, do not possess outstanding wear resistance.

U.S. Pat. No. 3,417,386 issued Dec. 17, 1968 to R. A. Schneider, suggests a metal or metal alloy coating or a carbide coating. However, metal and alloy coatings, some of which are known for hardness, are not very wear resistant. Carbides tend to spall and gall. When the latter occurs the magnetic tape of the credit card processed through the machine is often damaged. Materials allegedly superior to these are described in U.S. Pat. No. 3,665,436 issued May 23, 1972 to J. J. Murray, et al. They purpose ceramic layers such as chromium oxide. Such materials, typically applied by plasma plating, have been used in the industry with some success.

However, we have now discovered a protective coating for use with credit card readers, and advantageously with the reader described herein, that exhibits improved durability, can be applied with a solvent free coating process (in the spirit of OSHA standards), can be patterned by photodeposition or screen printing prior to curing to final hardness, and is inexpensive. The coating is a polymer of one or more of the following monomers:

a. 1-butane carbamic acid 2-methacryloyloxyethyl ester,
b. 1-butane carbamic acid 2-acryloyloxyethyl ester,
c. a mixture of isomers 2,2,4 - and 2,4,4,-trimethyl-1, 6-hexane dicarbamic acid di(2-methacryloyloxyethyl)ester, d. a mixture of isomer as above in (c) in which the esters are both 2-acryloyloxyethyl, e. di(4-cyclohexylcarbamic acid 2methacryloyloxyethyl ester)methane, f. the same as in (e) in which the esters are 2-acryloyloxyethyl.

The monomers may be prepared by first reacting a hydroxy substituted ester of acrylic or methacrylic acid with a mono- or difunctional isocyanate. The reaction of the hydroxyl group with the isocyanate yields a urethane. The reaction product can be polymerized readily by heat, light or electron beams. Photo-initiated polymerization implies that the coatings can be patterned by standard lithography. The polymerization advantageously involves a high degree of cross-linking of the monomers until the system becomes essentially saturated (above 70%). This class of materials and techniques for their preparation are described in U.S. Pat. No. 3,479,328 patented Nov. 18, 1969.

In a preferred form of the invention the coating comprises a polymerized mixture of mono- and difunctional monomers advantageously in a weight ratio of mono- to difunctional monomer of 9:1 to 4:6. Thus with the monomers a-f, a or b could be mixed with any of c through f. Normally the acrylates would be mixed and the methacrylates mixed so that the most typical examples would be: a with c or e and b with d or f. Ternary mixtures are also useful.

One of the properties of interest is the toughness of the polymer. This characteristic is a measure of the amount of energy the material can absorb without losing structural integrity. The latter limitation is referred to in terms of the yield point and the break point. The preferred range of weight ratios of the mono- and difunctional monomers have to do with this characteristic of the resulting polymer. If the weight ratio exceeds 9:1 the yield point of the polymer is lower than desired although, with certain formulations and for some applications, mixtures that exceed that ratio may still be found useful. As the ratio falls below 4:6 the resulting polymer becomes hard and brittle, and breaks before reaching a yield point. However again, special cases may allow a departure from this preferred limit.

DESCRIPTION OF THE DRAWINGS

FIG. 1 is a top view of a conventional credit card of a kind for reading with the apparatus of this invention;

FIGS. 2 and 3 are magnified top views of portions of the magnetic tape of the credit card of FIG. 1 showing the arrangement of the magnetic states in the tape;

FIG. 4 is a fragmentary projection view of a sensor arrangement for reading the credit card of FIG. 1;

FIG. 5 is a sectional view of the magnetic sensing head assembly and a suitably coded credit card; and FIG. 6 is a prospective view of the magnetic sensing head assembly.

DETAILED DESCRIPTION

FIG. 1 shows a typical plastic credit card 10 which bears an elongated magnetic tape 11. The tape includes a series of bars each forming a separate cell. In the absence of recorded information, the successive cells are magnetized in alternating directions along the axis of the tape as indicated by the oppositely directed arrows 12 in the figure. Each interface between a pair of oppositely magnetized cells is indicated by a broken line 13 normal to the axis of the tape. Each broken line corresponds to a change (or transition) in the magnetization direction within the tape.

FIG. 2 shows a section of tape 11 in an enlarged view. The arrows 12 indicate three separate cells defining two adjacent transistions 13. These transitions occur at regular intervals along the tape and define a constant cell length C therebetween. Data information is stored in a cell by including in the center of the cell a reversal in the direction of magnetization. FIG. 3 shows such an additional transition in the center of a representative cell defined by a pair of adjacent broken lines 13. This transition divides a cell into two regions and represents a data bit (viz: a binary one). The irregular transition is represented in the figure by a dotted vertical line as viewed. Note that the magnetization in regions 15 and 16 of FIG. 3 are reversed from the directions shown for these regions in FIG. 2 in order to store the data bit and to still maintain the end-of-cell transition. Apparatus to code credit cards of this type in this manner is in common use and is operative normally to so maintain the cell length constant.

FIG. 4 shows code conversion apparatus (a credit card reader) in accordance with one embodiment of this invention for reading a credit card bearing a magnetic tape coded as described in FIG. 1, 2, and 3. The card is placed, tape down, against a surface 20 and abutting a guide 21. Typically the card is inserted in a slot defined by surface 20 and a plate 22 secured to guide 21 to press the card against surface 20. FIG. 4 also shows magnetoresistive sensor apparatus 25 inserted into the surface 20 and level therewith. Apparatus 25 is responsive to the transitions of tape 11 as the card is moved to the left as indicated by arrow 26 in the figure. Plate 22, in pressing card 10 against surface 20, ensures close proximity between the tape and the sensor apparatus to provide suitable output signals from that apparatus.

The sensor apparatus includes first and second magnetoresistive elements 30 and 31 astride the path along which tape 11 moves.

The sensor apparatus is shown in greater detail in FIGS. 5 and 6. In FIG. 5 the magnetic detectors 50 and 51 are shown arranged on a rigid substrate 52 which may be glass, ceramic or other suitable non-magnetic material. The magnetic elements 50 and 51 are of an appropriate magnetic material such as permalloy. Overlying the sensing elements and the support substrate is the protective coating 53 in accordance with the invention. The credit card 54 carrying a coated magnetic tape 55 is shown positioned so as to communicate magnetically with the magnetic sensing elements. The magnetic sensing head assembly is shown in prospective in FIG. 6. Numerals designating similar elements are repeated in FIG. 6. FIG. 6 shows additionally gold leads 60 and 61 interconnecting the magnetic elements 50 and 51 with a bonding area 62 near the edge of the assembly. This is simply an area free of polymer coating giving access to the external decoating circuitry. As indicated before the protective coating 53 is formed of one of the urethane modified acrylic polymers mentioned previously.

Examples of preparation techniques of these materials are given the following:

EXAMPLE 1

210.5 grams of butyl isocyanate were added dropwise with stirring over a 3 hour period to 294.3 grams of 2-hydroxyethyl methacrylate stabilized with 1200 ppm of hydroquinone monomethyl ether. The temperature was raised to 70° C. Heating and stirring were continued for 2 hours after addition was completed. The reaction product was 1-butane carbamic acid 2-methacryloyloxyethyl ester.

EXAMPLE 2

145.3 grams of butyl isocyanate and 180.7 grams of 2-hydroxyethyl acrylate, stabilized with 400 ppm of hydroquinone monomethyl ether, were reacted together for 6 hours at 75° C to give 1-butane carbamic acid 2-acryloyloxyethyl ester.

EXAMPLE 3

98.5 grams of trimethylhexamethylene diisocyanate and 130 grams of 2-hydroxyethyl methacrylate were reacted together with stirring for 6 hours at 70° C to give a mixture of 2,4,4 -and 2,2,4 -trimethyl-1, 6-hexane dicarbamic acid di(2-methacryloyloxyethyl)ester.

Other materials may be added to the four monomers indicated above to facilitate polymerization and/or to improve some property of the formulation or of the final polymer. These other materials may have as much as 25 percent of the total formulation. In this class of additives are:

a. thermal polymerization initiators, such as those described in *Free Radicals* by William A. Pryor, McGraw-Hill Book Company, N.Y., 1966 and references cited therein b. photochemical polymerization initiators, such as those described in *Light-Sensitive Systems* by Jaromir Kosar, John Wiley and Sons, Inc., N.Y., 1965 and references cited therein c. viscosity builders and thixotropic agents, such as the polymers described and/or finely divided silica d. wetting and antisettling agents, such as Nuosperse and Modaflow e. pigments and dyes f. stabilizers, such as hydroquinone t-butyl catechol, or hydroquinone monomethyl ether g. fire retarding materials, such as antimony oxide or compounds of phosphorous, carbon and/or the halogens h. plasticizers, such as diesters of phthalic acids and i. deodorants, such as alcohols, to mask the odor or unreacted isocyanates j. inert mineral fillers such as silica, alumina, and chalk.

EXAMPLE 4

A mixture of 30 part by weight of material prepared from Example 1 and 10 part of material prepared from Example 2, with or without 5 parts of fumed silica, and 0.5 parts of benzoin methyl ether were coated, either spin or roller, onto the detector substrate.

The coating is cured by a short exposure 30 sec to actinic radiation from a medium pressure mercury arc 40m Wcm$^{-2}$ at 365 nm in a nitrogen or air atmosphere. The coating may be further cured thermally, e.g. at 150° C for half an hour. When a pattern is desired in the coating, a mask can be aligned over the coated sample and exposure made through the mask. The mask should be transparent in those areas in which the coating is desired and opaque in the areas which should be uncoated. The regions on the sensor head that correspond to the opaque areas of the mask can be cleaned of monomers after exposure by washing with an organic solvent such as benzene or toluene. Such a region appears in FIG. 6 over the bonding area at the edge of the structure.

Various additional modifications and extensions of this invention will become apparent to those skilled in the art. All such variations and deviations which basically rely on the teachings through which this invention has advanced the art are properly considered to be within the spirit and scope of this invention.

What is claimed is:

1. In a magnetic tape sensor adapted for reading magnetically coded data contained in a magnetic tape, the sensor comprising:
 a housing containing a sensing head for detecting magnetic field variations as the magnetic tape passes it, the sensing head comprising a rigid support, a magnetic sensing element arranged on the rigid support, and a protective coating overlying the sensing element; and a code conversion circuit connected to the sensing element for converting the variations in magnetic field to electrical signals, the invention characterized in that the protective coating is a polymer of one or more of the following:
 a. 1-butane carbamic acid 2-methacryloyloxyethyl ester,
 b. 1-butane carbamic acid 2-acryloyloxyethyl ester,
 c. a mixture of isomers 2,2,4 - and 2,4,4-trimethyl-1, 6-hexane dicarbamic acid di(2-methacryloyloxyethyl)ester,
 d. a mixture of isomers 2,2,4 - and 2,4,4-trimethyl-1, 6-hexane dicarbamic acid di(2-acryloyloxyethyl)ester,
 e. di(4-cyclohexylcarbamic acid 2-methacryloyloxyethyl ester)methane,
 f. di(4-cyclohexylcarbamic acid 2-acryloyloxyethyl ester)methane.

2. The magnetic tape sensor of claim 1 in which the protective coating is applied to selective portions of the support and sensing element.

3. The device of claim 1 in which the polymer is a polymerized mixture of monomers.

4. The device of claim 3 in which the mixture is a mixture of *a* or *b* with one or more of *c*, *d*, *e* and *f*.

5. The device of claim 4 in which the mixture is selected from the group consisting of *a* and *c*, *a* and *e*, *b* and *d*, and *b* and *f*.

6. The device of claim 5 in which the weight ratio of *a* or *b* to the remaining ingredients of the mixture is in the range of 9:1 to 4:6.

7. In apparatus for processing magnetic data contained on a credit card or the like moved along an axis through said apparatus comprising a magnetic sensing head for detecting magnetic field variations as the credit card passes it, the sensing head containing first and second sensor elements spaced apart a prescribed distance along an axis and responsive independently to each bit of a coded sequence of bits moved along that axis to generate first and second signals respectively, and an electronic circuit responsive to said first and second signals to generate a data stream and a separate clocking signal, said apparatus including means for applying to said circuit in each instance the second signal which corresponds to the bit of said sequence at said first sensor for providing said data stream and clocking signal, wherein said bits have a characteristic cell length and said last-mentioned means comprises a spacing of one-half a cell length between said first and second sensor elements, said magnetic sensing head further comprising a durable protective coating covering the first and second sensor elements, the invention characterized in that said coating comprising a polymer of one or more of the following:
  a. 1-butane carbamic acid 2-methacryloyloxyethyl ester,
  b. 1-butane carbamic acid 2-acryloyloxyethyl ester,
  c. a mixture of isomers 2,2,4 - and 2,4,4-trimethyl-1,6-hexane dicarbamic acid di(2-methacryloyloxyethyl)ester,
  d. a mixture of isomers 2,2,4 - and 2,4,4-trimethyl-1,6-hexane dicarbamic acid di(2-acryloyloxyethyl)ester,
  e. di(4-cyclohexylcarbamic acid 2-methacryloyloxyethyl ester)methane,
  f. di(4-cyclohexylcarbamic acid 2-acryloyloxyethyl ester)methane.

* * * * *